(12) United States Patent
Alieiev et al.

(10) Patent No.: US 9,807,566 B2
(45) Date of Patent: Oct. 31, 2017

(54) METHOD AND DEVICE FOR ADJUSTMENT OF AT LEAST ONE PARAMETER OF A COMMUNICATION SYSTEM

(71) Applicant: VOLKSWAGEN AG, Wolfsburg (DE)

(72) Inventors: Roman Alieiev, Stendal (DE); Andreas Kwoczek, Lehre (DE); Thorsten Hehn, Wolfsburg (DE)

(73) Assignee: Volkswagen AG (DE)

( * ) Notice: Subject to any disclaimer, the term of this patent is extended or adjusted under 35 U.S.C. 154(b) by 14 days.

(21) Appl. No.: 15/225,883

(22) Filed: Aug. 2, 2016

(65) Prior Publication Data

US 2017/0041760 A1    Feb. 9, 2017

(30) Foreign Application Priority Data

Aug. 5, 2015   (DE) .................. 10 2015 214 968

(51) Int. Cl.
| | |
|---|---|
| *H04W 24/00* | (2009.01) |
| *H04W 4/02* | (2009.01) |
| *G01C 21/36* | (2006.01) |
| *G01S 5/02* | (2010.01) |
| *G01S 5/00* | (2006.01) |

(52) U.S. Cl.
CPC .......... *H04W 4/028* (2013.01); *G01C 21/367* (2013.01); *G01S 5/0072* (2013.01); *G01S 5/0273* (2013.01)

(58) Field of Classification Search
None
See application file for complete search history.

(56) References Cited

U.S. PATENT DOCUMENTS

| | | |
|---|---|---|
| 7,840,220 B1 | 11/2010 | Mitchell |
| 8,391,896 B2 * | 3/2013 | Curcio ................ H04L 29/06 455/414.2 |

OTHER PUBLICATIONS

Search Report for German Patent Application No. 10 2015 214 968.4; Mar. 7, 2016.

* cited by examiner

*Primary Examiner* — Suhail Khan
(74) *Attorney, Agent, or Firm* — Barnes & Thornburg LLP

(57) ABSTRACT

A method for adapting at least one parameter of a communication system between two subscribers, wherein at least one subscriber is mobile, in which case a current position of the mobile subscriber is determined at a time and a channel quality for a future time is estimated on the basis of the current position using an environmental model, wherein at least one parameter is changed at the future time on the basis of the estimation. Also disclosed is an apparatus.

12 Claims, 1 Drawing Sheet

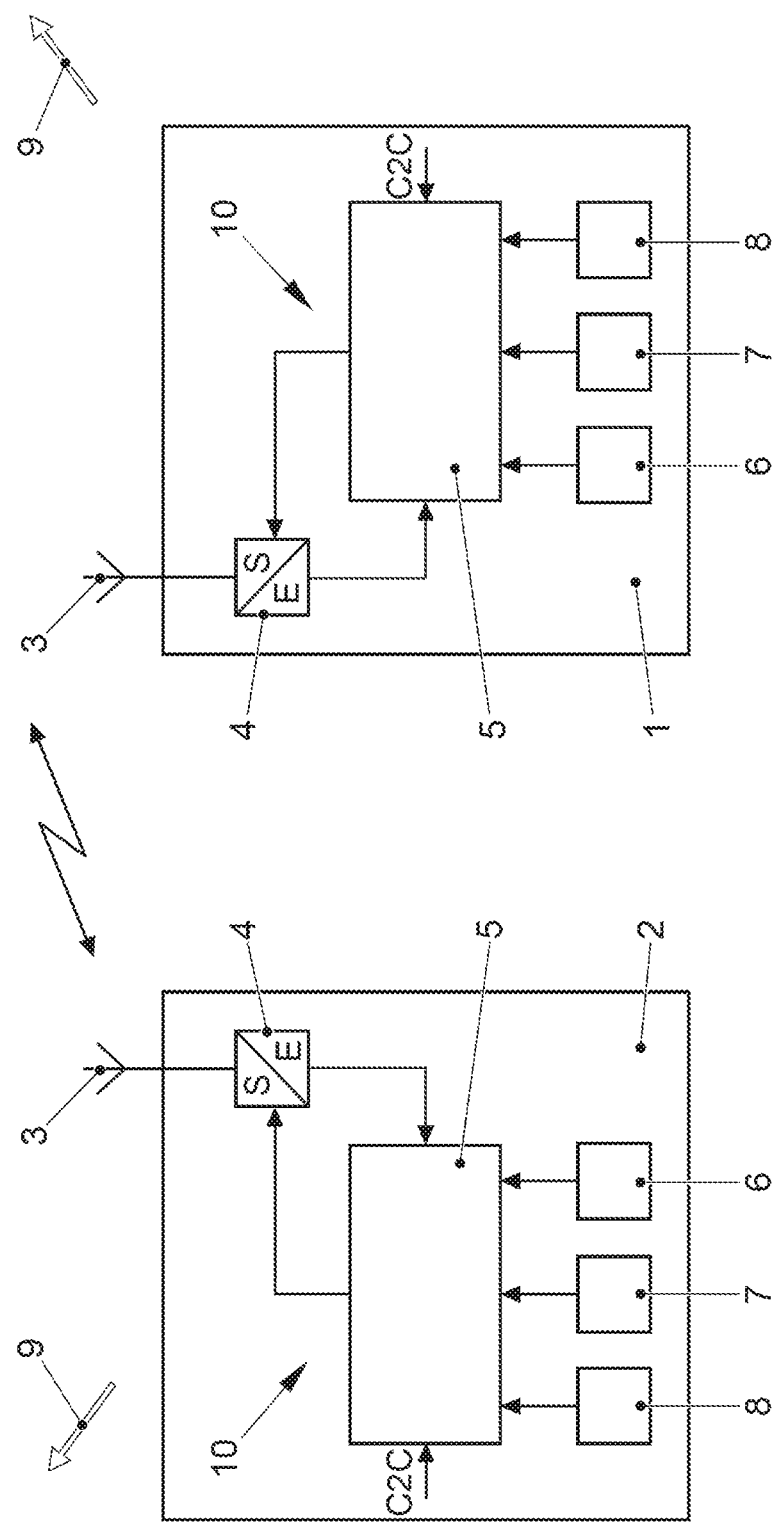

METHOD AND DEVICE FOR ADJUSTMENT OF AT LEAST ONE PARAMETER OF A COMMUNICATION SYSTEM

PRIORITY CLAIM

This patent application claims priority to German Patent Application No. 10 2015 214 968.4, filed 5 Aug. 2015, the disclosure of which is incorporated herein by reference in its entirety.

SUMMARY

Illustrative embodiments relate to a method and an apparatus for adapting at least one parameter of a communication system.

BRIEF DESCRIPTION OF THE DRAWINGS

Disclosed embodiments are explained in more detail with reference to the drawing, in which:

The FIGURE shows a schematic illustration of the mobile radio communication between two subscribers.

DETAILED DESCRIPTION

Digital communication, for example, via the mobile radio network, is now ubiquitous. Users expect high data rates, low latency and a high degree of reliability. To achieve this, transmitters and receivers are newly adjusted to the given situation each time. The properties of the channel between the transmitter and the receiver are regularly estimated and parameters which influence the data rate and robustness are adjusted according to this estimation. Existing mobile communication methods are based on the assumption that a communication connection exists between a static transmission station (Base Transceiver Station BTS or Evolved Node B eNB) and a portable terminal UE (User Equipment), the transmission station may be arranged at an elevated position and the mobile motion patterns of the terminals being relatively slow and random.

In the case of relatively slow and random movements, the so-called "slow and random fading" dominates, for which an estimation of the movement brings few benefits. In addition, most antennas for the terminals are not designed with orientable antennas to adapt to the environment. Future mobile communication systems or mobile communication systems in development are based on heterogeneous communication systems having different communication connections. Complex static or mobile transmission stations may therefore communicate with simple or complex mobile terminals (for example, a motor vehicle) or else motor vehicles can communicate directly with one another. These new scenarios are characterized by different motion patterns, antenna arrangements or other physical or logical relationships between the vehicle and the environment. This results in the known channel estimation models no longer being optimally suitable, for example, because the antennas of vehicles are generally no longer as high as in the static switching centers and the range is also generally shorter in the case of connections between two vehicles. Therefore, fast, but estimable channel fading will be a decisive feature in the case of very fast motion patterns with previously known trajectories. Vehicles and other terminals or switching centers may have different, but fixed antenna arrangements, in which case separation by means of different antenna elements is carried out. This is complicated. Alternatively, new ways which take these circumstances into account must be pursued.

Digital communication uses various mechanisms to adjust to the current channel between the transmitter and the receiver. This is carried out in two operations.

In a first operation, the channel between the transmitter and the receiver is estimated. The transmitter embeds known symbols (pilot sequence) in the signal at predefined locations. The receiver uses the distorted image of the known signal to estimate the interference caused by the channel. In so-called closed-loop estimation, the receiver transmits this information to the transmitter via the channel. In open-loop channel estimation, the transmitter uses responses from the receiver to estimate the channel. This is based on the assumption that the channel is symmetrical.

In a second operation, the transmitter adjusts parameters of the communication system to adjust to the given channel. Such a parameter is, for example, the transmission strength or a modulation alphabet which indicates how many different symbols can be transmitted. A further parameter is the information rate (also called code rate), for example. The information rate of a block code of a length across a modulation alphabet denotes the information symbols which are transmitted per code word in relation to the length of the words. Another parameter may be, for example, the adjustment of antenna diversity. These parameters influence the data rate, latency and reliability of the transmission.

In this case, the known methods for adapting a parameter are subjected to certain restrictions. For example, the frequency of the pilot sequences is intended to be as low as possible to avoid excessively reducing the number of data symbols. However, the channel is estimated only at particular times as a result. The assumption of the symmetry of the channel is not ensured in most cases, for example, if a subscriber is moving very quickly. This applies independently of the transmission method (for example, TDMA, CDMA, FDMA etc.). Therefore, the closed-loop method is predominantly used for estimation. However, since the return channel to the transmitter costs bandwidth, only statistical information is often transmitted from the receiver to the transmitter.

Disclosed embodiments are based on the technical problem of providing a method for adapting at least one parameter of a communication system between two subscribers, at least one subscriber being mobile, which method allows improved estimation of the channel quality. Another technical problem is to provide a suitable apparatus for estimating the channel quality.

The technical problem is solved by the disclosed method and by the disclosed apparatus.

The method for adapting at least one parameter of a communication system between two subscribers, at least one subscriber being mobile, comprises the following operations. A current position of the mobile subscriber is determined at a time t0 and a channel quality for at least one future time t1, t2 is estimated on the basis of the current position using an environmental model, at least one parameter being changed at the future time t1, t2 on the basis of the estimation. The basic idea of the disclosed embodiments is that the environment (for example, tall houses, forest areas etc.) has a decisive influence on the channel quality. Expressed in a simplified manner, reflections occur in the case of tall houses, resulting in multipath propagations, whereas scarcely significant reflections occur in forest areas. Multipath propagations may be used if they can be well estimated or predicted. This can then be used to increase the performance at the receiver. This is now deliberately taken into account according to the disclosed embodiments to estimate the channel quality. In this case, the mobile subscriber may be a motor vehicle. The benefit with a motor vehicle is that the orientation of the antenna is known in advance, which improves the estimation. In this case, the other subscriber may be stationary (, a base station) or else may also be mobile (for example, another motor vehicle).

In at least one disclosed embodiment, the speed of the at least one mobile subscriber is determined, a motion vector being determined using the current position and the speed and being used to estimate a position of the mobile subscriber at the time t1 of the parameter change. This allows improved accuracy of the estimation of the channel quality at the time t1. In this case, the estimation for the time t1 is primarily based on the data available in the mobile subscriber. In this case, t1 is in a range of less than one second, for example.

If both subscribers are mobile, the motion vector may be determined for both subscribers. The channel quality can then be estimated using the estimated positions of both subscribers at a time t2 on the basis of the environmental model. In this case, the time t2 is more than one second after t0. This is therefore a more anticipatory estimation. The times for t1 and t2 which can accurately be achieved are dependent in this case on different factors, for example, the speed of the subscribers.

In another disclosed embodiment, both subscribers are mobile subscribers, i.e., motor vehicles, at least one subscriber transmitting its estimated position at the time t2 to the other subscriber by means of separate communication or sensors. The benefit is that the transmitting subscriber receives the information, in which case the actual mobile radio channel is not loaded. For example, the estimated position is transmitted by means of car-2-car communication. In this case, car-2-car communication is generally understood as meaning a special wireless communication connection via a separate communication channel based on the IEEE 802.11 standard, for example. This may be the 802.11p, a, b or g standard, for example.

In another disclosed embodiment, to determine the channel quality, the position and motion vector of further mobile subscribers within a communication range between the two subscribers are additionally taken into account. For example, large reflective trucks may be concomitantly included in the channel estimation. In this case, all further mobile subscribers can be taken into account or else only selected subscribers (for example, only trucks).

In another disclosed embodiment, the environmental model may be an at least three-dimensional digital road map since the reflections can be better estimated by additionally taking into account the height. Propagation vectors or the like may additionally also be assigned to objects of the road map and describe their influence on the radio waves.

In another disclosed embodiment, the at least one parameter is a transmission strength and/or a modulation alphabet and/or an information rate and/or an antenna setting of a transmitting and/or receiving antenna, which may be diversity antennas.

In another disclosed embodiment, the data relating to a calculated route of a navigation system are taken into account when determining the motion vector. This makes it possible to further improve the estimation using the position of the subscriber(s).

In another disclosed embodiment, the communication between the two subscribers takes place via at least one further subscriber (multi-hop communication). This becomes important if the position and motion vectors of further subscribers are also known.

The apparatus for adapting at least one parameter of a mobile radio channel between two subscribers, at least one parameter being changed on the basis of an estimated future channel quality, is designed in such a manner that at least one current position of a mobile subscriber is detected or determined. The channel quality for a future time t1, t2 is estimated using the current position and an environmental model, at least one parameter being changed at the time t1, t2 on the basis of the estimation. With regard to further configurations, reference is conditionally made to the preceding statements with respect to the method.

The FIGURE illustrates two subscribers 1, 2 between which mobile radio communication takes place via at least one mobile radio channel. In this case, the two subscribers are motor vehicles. Each of the motor vehicles has an antenna 3 which may have adaptive antenna elements and may be a diversity antenna, for example. The motor vehicles also have a transmitting/receiving unit 4, an evaluation and control unit 5, a positioning device 6, a navigation system 7 and an environmental model 8. The positioning device 6 is a satellite-based positioning device, for example. In this case, the elements 3-8 form an apparatus 10. Furthermore, data relating to car-2-car communication are supplied to the evaluation and control unit 5. In this case, it is noted that the satellite-based positioning device 6, which may be a GPS receiver, for example, and the environmental model may also be integrated in the navigation system as parts. In this case, the environmental model 8 may be an at least three-dimensional digital road map.

The two subscribers 1, 2 now each estimate at the time t0 where they will presumably be at the time t2. The difference between t2 and t0 is more than one second, for example. For this purpose, the evaluation and control unit 5 calculates a motion vector 9, the direction being able to be given by a calculated route in the navigation system 7. The speed can be determined from a GPS differential signal, for example, or may be provided by other vehicle sensors (for example, wheel speed sensors). By means of the motion vector 9, the evaluation and control unit 5 then knows where the subscriber 1, 2 will presumably be at the time t2. The evaluation and control unit 5 then uses the environmental model 8 to determine what the channel quality will be like, for which purpose the estimated position of the other subscriber at the time t2 is additionally taken into account. In this case, the two subscribers 1, 2 can interchange the respectively estimated positions at the time t2 by means of car-2-car communication. Estimated positions of other subscribers at the time t2 can also be transmitted using car-2-car communication, thus producing a dynamically updated environmental model. The evaluation and control unit 5 then changes at least one parameter on the basis of the estimated positions of the two subscribers 1, 2 at the time t2 and their position in the environmental model 8 to keep or improve the channel quality at the time t2. It goes without saying that situations in which a parameter does not need to be changed as a result are also possible.

The transmission and consideration of the position and the motion vector of the other subscriber constitute a long-term estimation in this case.

However, it is possible for one subscriber to estimate the channel quality only on the basis of its own available data, for example, the position and speed, for a shorter time t1 of less than one second, for example. In this case, an estimated position of the other subscriber at the time t1 may also be included, which position is known in advance, for example, and does not need to be transmitted.

The invention claimed is:

1. A method for adapting at least one parameter of a communication system between two subscribers, wherein at least one of the two subscribers is mobile, the method comprising:
determining a current position of the mobile subscriber at a time $t_0$,
estimating a channel quality for a future time $t_1$, $t_2$ based on the current position using an environmental model;
changing at least one parameter at the future time $t_1$, $t_2$ based on the estimation;
determining speed of the at least one mobile subscriber;
determining a motion vector using the current position and the speed; and
using the motion vector to estimate a position of the mobile subscriber at the time $t_1$ of the parameter change,
wherein, to determine the channel quality, a position and a motion vector of further mobile subscribers within a communication range between the two subscribers are additionally taken into account.

2. The method of claim 1, wherein all the subscribers are mobile subscribers, and at least one subscriber transmits its estimated position at the time $t_1$, $t_2$ to the other subscriber by a further communication connection.

3. The method of claim 1, wherein the environmental model is an at least three-dimensional digital road map.

4. The method of claim 1, wherein the at least one parameter is a transmission strength and/or a modulation alphabet and/or an information rate and/or an antenna setting of a transmitting and/or receiving antenna.

5. The method of claim 2, wherein the determination of the motion vector takes into account data relating to a calculated route of a navigation system.

6. The method of claim 4, wherein mobile radio communication between the two subscribers takes place via at least one further subscriber in the communication range.

7. An apparatus for adapting at least one parameter of a communication system between two subscribers, wherein at least one parameter is changed based on an estimated future channel quality, wherein at least one current position of at least one mobile subscriber of the two subscribers at a time $t_0$ is detected or determined and the channel quality for a future time $t_1$, $t_2$ is estimated using the current position and an environmental model, wherein at least one parameter is changed at the time $t_1$, $t_2$ based on the estimation, speed of the at least one mobile subscriber is determined, a motion vector is determined using the current position and the speed and is used to estimate a position of the mobile subscriber at the time $t_1$ of the parameter change, and wherein the channel quality is determined while taking into account a position and a motion vector of further mobile subscribers within a communication range between the two subscribers.

8. The apparatus of claim 7, wherein all of the subscribers are mobile subscribers, and at least one subscriber transmits its estimated position at the time $t_1$, $t_2$ to the other subscriber by a further communication connection.

9. The apparatus of claim 7, wherein the environmental model is an at least three-dimensional digital road map.

10. The apparatus of claim 7, wherein the at least one parameter is a transmission strength and/or a modulation alphabet and/or an information rate and/or an antenna setting of a transmitting and/or receiving antenna.

11. The apparatus of claim 8, wherein the determination of the motion vector takes into account data relating to a calculated route of a navigation system.

12. The apparatus of claim 10, wherein mobile radio communication between the two subscribers takes place via at least one further subscriber in the communication range.

* * * * *